March 18, 1947. W. A. HAYES 2,417,752
SECURING MEANS FOR ANTI-SKID DEVICES
Filed Nov. 3, 1944
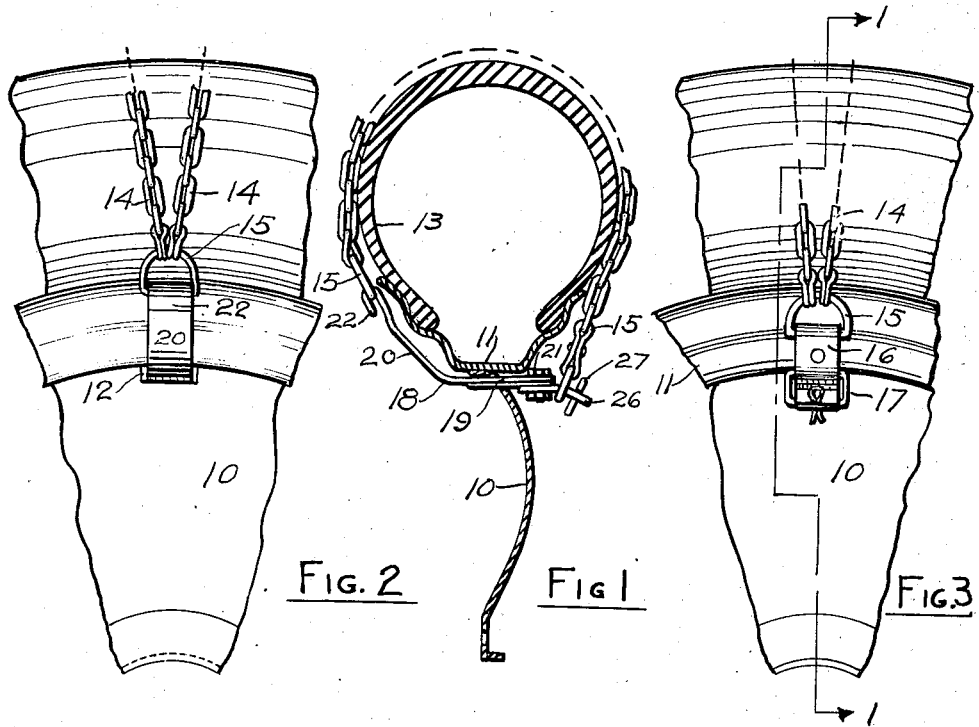
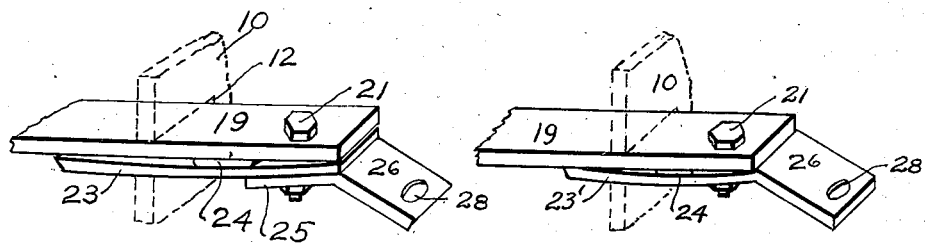
INVENTOR.
WALTER A. HAYES
BY
Marlind E. Anderson
ATTORNEY Patented Mar. 18, 1947

2,417,752

UNITED STATES PATENT OFFICE 2,417,752

SECURING MEANS FOR ANTISKID DEVICES

Walter A. Hayes, Denver, Colo.

Application November 3, 1944, Serial No. 561,769

3 Claims. (Cl. 152—237)

This invention relates to improvements in fasteners for emergency anti-skid devices.

It is well known that an automobile or truck wheel looses most of its traction when it rests on soft ground or mud and has a tendency to dig itself into the mud to such an extent as to make the task of freeing the automobile very difficult. Where muddy roads are encountered, it is desirable to provide the traction wheels with anti-skid chains of some sort. The ordinary anti-skid chains that extend completely around the wheel are very difficult to apply, even when the automobile is standing on a solid surface and it is practically impossible to apply such chains after a wheel has dug itself into the mud.

I am aware that anti-skid devices for emergency use have been provided which comprise short sections of transverse chains with straps or other means for securing them in position on an automobile wheel. Wheels of the type known as disk wheels are ordinarily provided with three openings in the disk portion, adjacent the tire rim, through which straps may be inserted for securing emergency anti-skid devices in place. When a wheel is covered with mud as it is in such emergencies, it is very difficult to insert a strap in the strap opening in a disk wheel for the reason that the strap must be insterted from the inside and this requires that the operator must get himself into a position where he can reach the inner surface of the wheel and manipulate the strap with sufficient exactness to insert it in the opening. After a strap has been inserted and the emergency device is strapped in place, the sharp edge of the strap opening very soon severs the strap with the consequent loss of traction and sometimes with a loss of the emergency device.

It is the object of this invention to produce a fastening means for use in securing emergency anti-skid devices to disk wheels and which shall be so constructed that the chains or mud lugs comprising such anti-skid devices can be quickly secured in place without the necessity of the operator getting into an awkward position.

Another object of the invention is to produce an attaching means of the class referred to which shall be of a simple construction so that it may be manufactured and sold at a comparatively low price and which, in addition, shall be provided with means for securely clamping it in position in a strap opening so that it can remain attached to the wheel during normal operation of the automobile.

Another object of the invention is to produce a device of the kind specified which shall be provided on the inside of the wheel with means for cooperating with a supplemental means on the chains or mud lugs to effect a secure and ready connection between the inner end of the chains and the inner end of the attaching means.

A further object of the invention is to produce a device of the kind specified which shall be of such construction that the emergency anti-skid devices can be attached quickly and held in close relation to the tire without necessitating the use of bolts or any special tools.

Having thus described the objects of the invention, the invention itself will now be described in detail, and for this purpose reference will be had to the accompanying drawing in which the invention has been illustrated in its preferred form, and in which:

Figure 1 is a section through an automobile wheel taken on line I—I, Figure 3;

Figure 2 is a side elevation of a portion of an automobile wheel showing the anti-skid device in position;

Figure 3 is a side elevation showing the other side of the wheel with the anti-skid device in position;

Figure 4 is a fragmentary view showing the attaching device to an enlarged scale for the purpose of more clearly showing its construction; and Figure 5 is a view similar to that shown in Figure 4 and shows a slightly modified form of construction.

In the drawing reference numeral 10 designates the disk portion of a disk wheel. The tire rim 11 is secured to the periphery of the disk in the usual manner. The disk is provided with three strap openings 12, one of which is shown in the drawing. This opening is positioned adjacent the inner surface of the tire rim approximately as shown in Figure 1. In the drawing a tire casing 13 has been shown in position in the rim. The inner tube has not been shown because to do so would unnecessarily complicate the drawing.

Although the cross section of the tire rim and the tire have been illustrated in a manner approximating the actual construction, it is to be understood that the exact cross section shown is not material so far as the present invention is concerned. The anti-skid device which has been used as an illustration consists of one or two chains 14, whose ends are secured to D-loops or rings 15. In Figure 3, a leather strap 16 connects the D-loop with a rectangular loop 17, although this is not a necessary feature of the construction because the leather loop 16 may be omitted if desired.

No invention is claimed in the anti-skid device itself and the one that has been shown is merely illustrative and any suitable type of chain or mud lugs can be substituted if desired.

The present invention relates to the means for securing the anti-skid device in place. The anti-skid device consists of a metal bar of rectangular cross section which is bent at the point 18 so as to form two arms or sections 19 and 20. The portion designated by reference numeral 19 is preferably straight and is provided near its outer end with an opening for the reception of a bolt which has been designated by reference numeral 21. The part designated by reference numeral 20 extends upwardly along the inside wall of the tire rim and terminates in a hook 22. Part 19 extends through the strap opening from the inside to the outside of the disk 10 as shown in Figure 1, where the righthand side of the wheel section is the outside of the wheel.

Referring now more particularly to Figures 1 and 4, it will be seen that a separate piece of flat steel 23 is positioned on the under side of the part 19 and extends through the opening in the disk which in this figure has been shown by dotted lines. A wedge 24 is positioned between the adjacent flat surfaces of parts 19 and 23. A third piece of flat steel bar having two angularly related sections 25 and 26 has its end 25 positioned underneath the bar 23 and is provided with an opening for the reception of bolt 21 by means of which the three parts are secured in assembled relation. Wedge 24 serves as a fulcrum and by tightening the nut on bolt 21, a force is produced tending to bend parts 19 and 23 and to spread them where they pass through the strap opening, thereby clamping the assembly to the sides of the opening, and wedging it in position therein. In Figure 4 the space between bars 19 and 23 has been purposely exaggerated so as to more clearly show the construction. In the actual construction the combined thickness of bars 19 and 23 is such as to barely permit the two to be inserted into a strap opening. After they have been inserted, they are pried apart at the outer ends by means of a screwdriver or some similar tool and the wedge 24 inserted, after which the bolt and the third member are attached and the assembly clamped in position by tightening the bolt.

From Figures 4 and 5 it will be seen that the upper surface of part 19 and the lower surface of part 23 are inclined relative to each other forming a wedge-shaped assembly that tapers towards the left and prevents the assembly from moving towards the left relative to the disk. The part 24, which is preferably tapered or wedge-shaped forms a fulcrum, as above explained. In the drawing the parts have been shown as they appear after the bolt has been tightened to the maximum. Before parts 19 and 23 have been bent so as to bring their adjacent surfaces into engagement the upper surface of wedge 24 projects above a straight line joining the ends of part 23 so that it can act as a fulcrum the same as if it formed an integral thickened portion of part 23.

After the fastening means has been positioned in a strap opening and clamped in position therein, it occupies a position substantially like that shown in Figure 1. These fasteners are designed to remain in position after they have once been secured to the wheel. When the anti-skid device is to be applied, the operator takes one of the D-loops 15, and, reaching over the tire, connects the same with the hook 22. The D-loop at the other end of the anti-skid device is then slipped over the projection 26. A cotter pin 27 is then inserted through the opening 28, which is provided for this purpose. By means of a screwdriver, it is possible to slip the loop 17 over the end 26 when the parts are so proportioned that the chains are under considerable tension. When the anti-skid devices are to be removed, the cotter pin is first removed from the opening, after which the connection to the hook 22 can be disengaged by merely pushing the anti-skid device inwardly over the tire.

In Figure 5 a slightly different form of the invention has been illustrated. This differs from the one shown in Figure 4, merely in this, that the end 26, is a continuation of the bar 23', instead of being formed by a separate piece, as shown in Figure 4. The construction shown in Figure 4 and described above, is desirable where a very tight wedging action is desired before the wedge 24 is introduced because with this construction the outer end of part 23 can be hit with a hammer so as to force it into the opening. With the construction shown in Figure 5, the use of a hammer for inserting member 23' is not advocated for the reason that such force tends to bend the projecting end 26. However, when the wedge 24 is in position, a very reliable clamping action can be obtained when the combined thickness of parts 19 and 23' are slightly less than the width of the opening.

In the above description and on the drawing one form of the invention has been illustrated, together with a slight modification. However, it is to be understood that other mechanical equivalents may be substituted for those shown without departing from the invention as defined in the claims. One modification contemplated is to provide the inner end of part 20 with a hole and to provide the anti-skid device with a hook. Since this merely involved a reversal of the construction shown, it has not been illustrated.

Attention is again directed to the fact that the assemblies comprising parts 19 and 23 are to remain permanently in position and are therefore wedged firmly in the openings 12 where they are available at all times.

Having described the invention what is claimed as new is:

1. An anchoring device for attaching emergency anti-skid devices to disk wheels having strap openings, comprising a bar having one end provided with a hook, the bar being bent intermediate its ends, the other end being provided with an opening for the reception of a bolt, the last named portion being adapted to extend through a strap opening in a wheel disk, and means for clamping the bar in position in the strap opening, comprising a second bar, positioned on the under side of the first bar, at the end having the opening, the second bar having an opening in register with the opening in the first bar, a bolt passing through the openings and a spacer member positioned between the adjacent surfaces forming a fulcrum.

2. An anchoring device for attaching an emergency anti-skid device to an automobile wheel of the disk type whose disk center has at least one strap opening adjacent its periphery, comprising a metal bar bent intermediate its ends to form two angularly related sections, the end of one of the sections having a hook, the other end being substantially straight and adapted to extend through a strap opening, a clamping member positioned on one side of the last mentioned section, the clamping member and the straight section having registering openings adapted to receive a bolt, a fulcrum element positioned between the two, the end of the clamping member beyond the opening terminating in an inclined extension forming one anchor for one end of an anti-skid device, the hook forming the other anchor.

3. An anchoring device for attaching an emergency anti-skid device to an automobile wheel having a disk center provided with one or more strap openings, comprising a metal bar bent intermediate its ends to form two angularly related sections, one section being straight and provided with an opening for the reception of a bolt, the straight section being adapted to extend through a strap opening with the perforated end on the outside, the other end having a hook, a clamping member positioned underneath the straight section, said clamping member having an opening for the reception of a bolt, a fulcrum element positioned between the adjacent surfaces of the bar and the clamping element and between the strap opening and the bolt whereby when the latter is tightened the bar and clamping element will move apart, on the other side of the fulcrum, into clamping engagement with the sides of the strap opening.

WALTER A. HAYES.

REFERENCES CITED

The following references are of record in the file of this patent:

UNITED STATES PATENTS

| Number | Name | Date |
|---|---|---|
| 1,927,779 | Cirman | Sept. 19, 1933 |